O. C. GREEN.
Harvester Rake.
No. 13,490.
Patented Aug. 28, 1855.
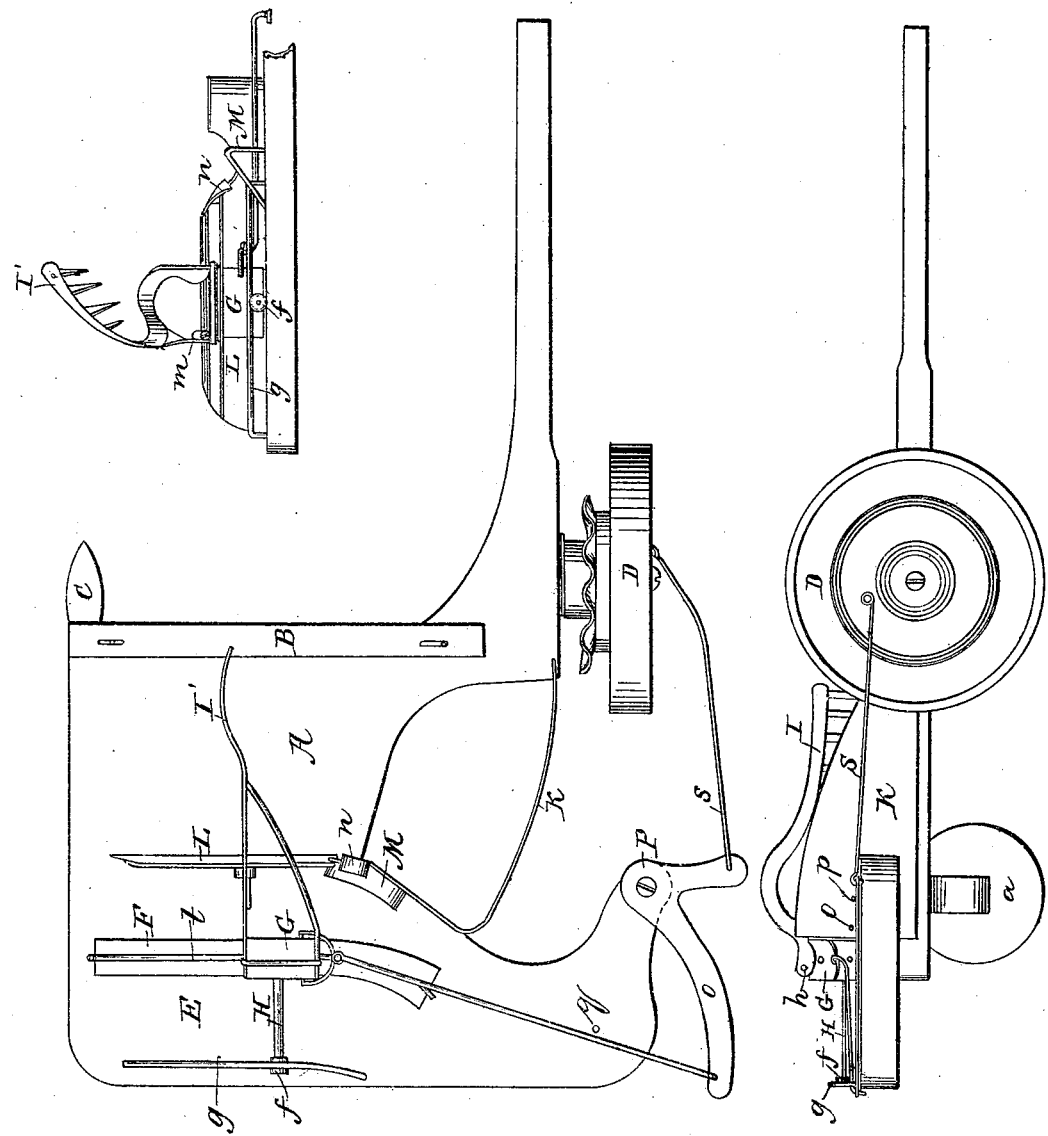

UNITED STATES PATENT OFFICE.

OLIVER C. GREEN, OF BELLEVILLE, ILLINOIS.

IMPROVEMENT IN HARVESTER-RAKES.

Specification forming part of Letters Patent No. 13,490, dated August 28, 1855.

*To all whom it may concern:*

Be it known that I, OLIVER C. GREEN, of Belleville, in the county of St. Clair and State of Illinois, have invented certain new and useful Improvements in Rakes as adapted to Harvesters; and I do hereby declare that the following is a full, clear, and exact description thereof, reference being had to the accompanying drawings, forming a part of this specification.

The nature of my invention consists in such an arrangement of the devices operating and the mode of constructing a rake applicable to any of the harvesting-machines now in use that a side delivery of the cut grain shall be effected in the most simple and efficient manner by an apparatus free from complexity, extra weight, or waste of propelling-power of the team employed.

To enable others skilled in the art to make and use my improvement, I will proceed to describe it as follows, reference being made to the accompanying drawings, in which like figures represent corresponding parts.

A represents the ordinary platform or grain-table found in most harvesters; B, the cutter-bar, on which the knives are secured; C, the nose or divider, and D the driving-wheel. Immediately behind the platform is a second one, E, extending back of the grain-wheel $a$. It may be formed of an extension of width of A or by a separate platform secured thereto.

F is an opening partially extending across the platform parallel to the line of cutters, or nearly so.

$b$ is a metal rod, forming a guide or way. Two-thirds of its length it is also parallel to the knives, but the remaining portion toward the delivery side of the machine is curved toward the back of the platform. This curved portion is for the purpose of changing the position of the bundle as it drops from the platform, so as to deliver it at right angles or across the track of the harvester, for the purpose of facilitating the operation of the binder. If the bundle of grain was dropped from the platform with a straight-moving rake, the binder would be obliged to turn around to perform that office. As it is, he approaches the bundle square to the work.

G is a sliding head, provided on its under side with suitable clasps to embrace the rail or way $b$, allowing the head freely to move thereon.

H is a steadying-rod extending from the back of G, the end resting on the platform furnished with a friction-wheel, $f$.

$g$ is a guide for said wheel to travel under.

I is the rake, connected to head G by suitable hinges, $h$, allowing it to have a vertical movement. A stop-spring can be applied when the weight of the rake is not sufficient to bring it down, and prevent it from being thrown too far back on the head.

$m$ is a crooked arm, descending from the rake-bar. It is also furnished with a friction-roller to facilitate its movement.

L is a fender-board, secured to the platform. It prevents the grain passing back of the grain-platform, and likewise serves the more important purpose of a way or guide, under which the wheel of the arm $m$ travels, and by which the rake is prevented from rising from the platform and overriding the grain when heavy thereon. It furthermore forms the return-way of the arm $m$ in bringing the rake to the nose side of the platform, ready to repeat its performance.

M is an incline way or plane, situated on the platform, so as to raise quickly the arm $m$, and with it the rake, sufficiently high to pass over the grain falling on the platform. It will be noticed that the fender-board L does not join the plane M, sufficient space being allowed between them for the passage of the wheel on $m$: but on the upper side of M a flap, $n$, is made to project and bridge over the opening. By this means the wheel of $m$ is permitted to pass the flap by raising it, and on the return of the rake the wheel passes over the opening on $n$.

O is a rock-shaft, pivoted at $p$; and $q$ is a connecting-rod from O to the sliding head, and S is a rod from the driving-wheel to the rock-shaft.

From the foregoing description it will be readily understood that on motion being given the driving-wheel the rake will be made to travel from the grain-wheel side of the platform and remove the cut grain therefrom, gradually making it into a bundle, and will deliver it by causing it to drop at the rear of the driving-wheel. To prevent any grain being dropped or scattered by too rapid a motion of the rake, a fender-board, of sheet metal, $k$, is placed at a suitable distance from the edge of the platform. Against this the grain may be thrown in bundles, ready for the binder.

In most of the vibrating rakes heretofore presented to the public a serious error has been committed—viz., that the first movement of the teeth of the rake pass in a line with the grain on the platform, then by a sweep it is passed to a side delivery. By this fault the grain is much tangled, heads mixed with butts of the straw, and the work performed in a very inefficient manner. In others where endless belts, &c., are used, and the delivery of the grain is effected by the rake moving across the platform, the grain is not made into workmanlike bundles, as there is more or less tendency to deliver the grain in a stream, from the fact that inventors have not considered the fact of the machine being continually moving forward while the raking process is taking place.

I am aware that the delivery of grain at right angles to the line of draft of the team has been accomplished by means of a rake traveling across the platform, in conjunction with a second rake turning in a segment of a circle, and therefore I do not claim the above-described delivery of grain irrespective of the means by which it is accomplished; but

What I claim as my improvement in rakes to harvesters, and desire to secure by Letters Patent, is—

The combination of the rake I, sliding head G, way or guide b, fender-board L, and incline plane M, or severally of their equivalents, operating in the manner and for the purpose above set forth, so that with a single rake I accomplish the raking of grain across the platform and the delivery thereof in the manner substantially as set forth.

In testimony whereof I have hereunto signed my name before two subscribing witnesses.

OLIVER C. GREEN.

Witnesses:
  W. S. CLARK,
  J. S. HOLLINGSHEAD.